United States Patent Office 3,282,921
Patented Nov. 1, 1966

3,282,921
HALO-DEOXYNUCLEOSIDES AND PROCESSES
FOR THE PREPARATION THEREOF
Julien P. H. Verheyden and John G. Moffatt, both of Palo
Alto, Calif., assignors to Syntex Corporation, Panama,
Panama, a corporation of Panama
No Drawing. Filed June 4, 1964, Ser. No. 372,712
22 Claims. (Cl. 260—211.5)

This invention relates to novel nucleoside derivative and to novel methods for their preparation.

More particularly, this invention relates, first of all, to novel halo-deoxynucleoside derivatives and to novel unhalogenated deoxynucleoside derivatives obtained therefrom by hydrogenation, which are represented by the general formula:

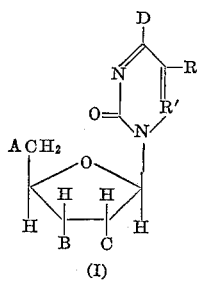

(I)

In this formula A, B and C each represent hydrogen or halogen, i.e., fluorine, chlorine, bromine, or iodine, with no more than two of A, B, and C being fluorine, and when any of A, B and C are halogen, at least one of them being other than fluorine; R represents hydrogen, fluorine, chlorine, bromine, iodine or a halo-lower alkyl group, e.g., trifluoromethyl or the like; an amino group, an amido group, a nitro group, a cyano group or a carboxy group, with R being other than halogen or a halo-lower alkyl group when any of A, B, C or D is hydrogen which has been introduced by hydrogenation of a halogen substituent, R' represents the grouping

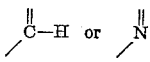

D represents a hydroxyl group, an amino group, fluorine, chlorine, bromine, iodine or a halo-lower alkyl group, e.g., trifluoromethyl or the like, with D being other than halogen or a halo-lower alkyl group when any of A, B or C is hydrogen which has been introduced by hydrogenation of a halogen substituent, and E represents a keto group, an imino (N=) group or a thio (S=) group. Other N-heterocyclic ring systems, e.g., substituted 1,3,5-triazine rings, can also be employed as the N-heterocyclic portion of the molecule.

A particularly preferred class of halo-deoxynucleoside and unhalogenated deoxynucleoside derivatives included in general Formula I hereinabove encompasses the halo-deoxyuridine derivatives and unhalogenated deoxyuridines prepared therefrom represented by the general formula:

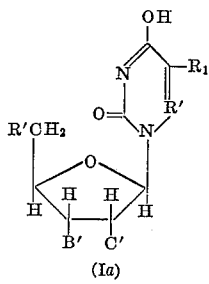

(Ia)

In this formula R' has the same meaning as set forth hereinabove for Firmula I; A', B' and C' each represent hydrogen, fluorine, chlorine, bromine, or iodine, with no more than one of A', B' being fluorine, and when any of A', B' and C' are halogen, at least one of them being other than fluorine, and $R_1$ represents hydrogen, fluorine, chlorine, bromine, iodine or a halo-lower alkyl group, e. g., trifluoromethyl or the like, with $R_1$ being hydrogen when A', B' or C' is hydrogen which has been introduced by hydrogenation of a halogen substituent.

This invention further relates to a novel method for the direct halogenation of the sugar moiety in pyrimidine nucleoside derivatives and their analogs to give, inter alia, the above-described halo-deoxynucleoside derivatives. This method comprises reacting a suitable pyrimidine nucleoside derivative which has, in at least one of positions 2'-, 3'- and 5'-, a free hydroxyl group, but which does not have adjacent free cis-hydroxyl groups in the 2' and 3'-positions, e.g., uridine, thymidine and cytidine derivatives (ribofuranosyl uracil, cytosine and thymine derivatives) having one free hydroxyl group in the 2'-, 3' or 5'-position, or two free hydroxyl groups in either the 2',5'- or the 3',5'-positions, or an arabinosyl or xylosyl uracil, cytosine or thymine derivative wherein the 2'- and 3'-hydroxyl groups are trans to each other, with either an alkyltriarylphosphonium halide wherein the halogen is chlorine, bromine or iodine, such as methyltriphenoxyphosphonium iodide or the like, or a halotriarylphosphonium halide wherein again the halogen is chlorine, bromine or iodine, such as iodotriphenylphosphonium iodide or the like, in an inert organic solvent under substantially anhydrous conditions, to replace said free hydroxy group or groups with halogen.

This invention further relates to a method for the preparation of unhalogenated deoxynucleoside derivatives, including the above-described deoxynucleosides of formula I containing only hydrogen at the 2'-, 3'- and 5'-positions, from the corresponding halo-deoxynucleotide derivatives, which comprises hydrogenating said halo-deoxynucleosides to replace halogen with hydrogen.

For purposes of illustration, the changes which take place in a representative number of pyrimidine nucleosides during these halogenation and hydrogenation procedures can be represented schematically as follows:

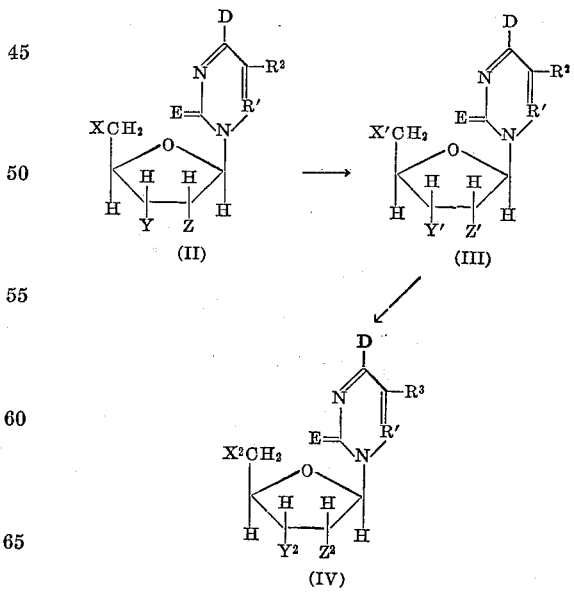

In these formulas X, Y and Z each represent hydrogen, hydroxyl, acyloxy, a labile ether grouping, i.e., one readily convertible to a hydroxyl group by acid hydrolysis, such as tetrahydrofuranyloxy, tetrahydropyranyloxy, diphenylmethoxy, triphenylmethoxy, p-nitrophenyloxy and benzyloxy groups, and the like, fluorine, chlorine, bromine or iodine, with at least one of X and Y being hydroxy, and when Y is hydroxyl Z is other than a hydroxyl cis to Y; when X represents a hydroxyl group Y and Z taken together can also represent a (lower)-alkylidenedioxy or aryl(lower)-alkylidenedioxy group represented by the general formula:

$$\begin{array}{c} -O \\ \phantom{-}\diagdown \\ \phantom{-O}C \\ \phantom{-}\diagup \phantom{C}\diagdown \\ -O \phantom{\diagup} R^5 \end{array} \begin{array}{c} R^4 \\ \\ \\ \end{array}$$

wherein $R^4$ represents hydrogen or a lower alkyl group, e.g., methyl, ethyl, propyl, and the like, and $R^5$ represents hydrogen, a lower alkyl group, or an aryl (including alkaryl and aralkyl) group, e.g., phenyl, tolyl, benzyl, and the like; X', Y' and Z' each represent hydrogen, hydroxyl, acyloxy, a labile ether grouping, fluorine, chlorine, bromine or iodine, with at least one of X' and Y' being chlorine, bromine or iodine which has replaced a hydroxyl group and Z' being other than cis-hydroxyl when Y' is hydroxyl; when X' represents chlorine, bromine or iodine Y' and Z' taken together can also represent a (lower) alkylidenedioxy or aryl(lower)alkyldenedioxy group as defined by formula V hereinabove; $X^2$, $Y^2$ and $Z^2$ each represent hydrogen, hydroxyl, acyloxy or a labile ether grouping, with at least one of $X^2$ and $Y^2$ being hydrogen which as replaced chlorine, bromine or iodine which, in turn, had previously replaced a hydroxyl group; when $X^2$ represents hydrogen $Y^2$ and $Z^2$ taken together can also represent a (lower) alkylidenedioxy or aryl(lower)alkylidenedioxy group as defined by Formula V hereinabove; R' has the same meaning as set forth hereinabove for Formula I; $R^2$ represents hydrogen, methyl, fluorine, chlorine, bromine, iodine or a halo-lower alkyl group, e.g., trifluoromethyl or the like; an amino group, an amido group, a nitro group, a cyano group or a carboxy group, and $R^3$ represents hydrogen, methyl, an amino group, an amido group, a nitro group, a cyano group or a carboxy group.

The acyloxy group referred to herein are preferably derived from a saturated or unsaturated hydrocarbon carboxylic acid containing less than 12 carbon atoms, which can be straight, branched, cyclic, cyclic-aliphatic or aromatic, and which can also either be unsubstituted or substituted with one or more non-interfering substituents, such as functionally converted hydroxyl groups, e.g., alkoxy and aryloxy groups containing up to 6 carbon atoms or acyloxy groups containing up to 12 carbon atoms, nitro groups, amino groups or halogen atoms. Included among these preferred acyloxy groups are those derived from acetic, amonoacetic, trimethylacetic, t-butylacetic, phenoxyacetic, propionic, cyclopentylpropionic, β-chloropropionic, enanthic, benzoic and p-nitrobenzoic acids, and the like.

In carrying out the novel halogenation process of the present invention, the free hydoxyl-containing nucleoside starting material (II), e.g., 2',3'-O-isoproylideneuridine (II; X=hydroxy, Y+Z=isopropylidenedioxy, $$R'=\overset{\overset{\displaystyle O}{\|}}{\underset{|}{C}}-H, \; R^2=\text{hydrogen})$$

dissolved in an inert organic solvent, such as dimethylformamide, dimethylacetamide, benzene, toluene, xylene, diethyl ether, dioxane, tetrahydrofuran, or the like, as well as mixtures thereof is reacted under substantially anhydrous conditions, at a temperature of from about 20° C. to about 60° C., and preferably at from room temperature (about 25° C.) to about 40° C., for from about 1 hour or less to about 170 hours or longer, with either an alkyltriaryloxyphosphonium halide or a halotriarylphosphonium halide wherein in either case, the halogen is chlorine, bromine, or iodine, to give the corresponding halonucleoside (III), e.g., 5'-deoxy-5'-iodo-2',3'-O-isopropylideneuridine (III; X'=iodine, Y'+Z'=isopropylidenedioxy, $$R'=\overset{\overset{\displaystyle O}{\|}}{\underset{|}{C}}-H, \; R^2=\text{hydrogen})$$

Included among the alkyltriaryloxyphosphonium halides which can be employed are (lower)alkyltri(monocyclic)aryloxyphosphonium halides such as methyltriphenoxyphosphonium chloride, methyltriphenoxyphosphonium bromide, methyltriphenoxyphosphonium iodide, methyl tris(p-nitrophenoxy) phosphonium chloride, ethyl tris(p-nitrophenoxy)phosphonium bromide, methyl tris(p-nitrophenoxy)phosphonium iodide, propyl tris(p-nitrophenoxy)phosphonium iodide, and the like, while the halotriarylphosphonium halides which can be used include halotri(monocyclic)aryloxyphosphonium halides such as chlorotriphenylphosphonium chloride, bromotriphenylphosphonium bromide, iodotriphenylphosphonium iodide, chlorotri-p-nitrophenylphosphonium chloride, bromotri-p-nitrophenylphosphonium bromide, iodotri-p-nitrophenylphosphonium iodide, and the like.

The alkyltriaryloxyphosphonium halides, which are known compounds, are prepared by reacting a triaryl phosphite, such as triphenyl phosphite, tri-p-nitrophenyl phosphite or the like, dissolved in an inert organic solvent, such as one of those mentioned hereinabove, e.g., dimethylformamide or the like, at a temperature of from about 20° C. to about 115° C., with from about 1 to about 100 molar equivalents of an alkyl halide, preferably a lower alkyl chloride, bromide or iodide such as methyl, ethyl or propyl chloride, bromide or iodide, or the like.

Similarly, the known halotriarylphosphonium halides are prepared by reacting a triaryl phosphine, such as triphenyl phosphine, tri-p-nitrophenyl phosphine, or the like, dissolved in an inert organic solvent, such as one of those mentioned hereinabove, e.g., dimethylformamide or the like, under substantially anhydrous conditions, at a temperature of from about 20° C. to about 100° C., with elemental chlorine, bromine or iodine.

The alkyltriaryloxyphosphonium halide or halotriarylphosphonium halide employed as the halogenating agent will be used to halogenate the free hydroxy-containing nucleoside starting material in amounts ranging from about 2 equivalents to about 5 equivalents, and preferably from about 2.5 equivalents to about 3.5 equivalents, per equivalent of hydroxyl groups to be halogenated in the nucleoside starting material.

An illustrative but by no means exhaustive listing of pyrimidine nucleosides which can be employed as starting materials for the novel halogenation process of the present invention includes:

2',3'-O-isopropylideneuridine,
2',3'-O-isopropylidene-6-azauridine,
2'-deoxyuridine,
2'-deoxy-2'-fluorouridine,
2'-chloro-2'-deoxyuridine,
2'-bromo-2'-deoxyuridine,
2'-deoxy-2'-iodouridine,
2'-deoxy-5-fluorouridine,
5-chloro-2'-deoxyuridine,
5-bromo-2'-deoxyuridine,
2'-deoxy-5-iodouridine,
2'-deoxy-5-trifluoromethyluridine,
thymidine,
3'-deoxythymidine,
5'-deoxythymidine,
5'-O-acetylthymidine,
5'-O-p-nitrobenxoylthymidine,
5'-O-p-nitrophenylthymidine,
3'-chloro-3'-deoxythymidine,
3'-bromo-3'-deoxythymidine,
3'-deoxy-3'-iodothymidine,
5'-chloro-5'-deoxythymidine,
5'-bromo-5'-deoxythymidine,
5'-deoxy-5'-iodothymidine, 2',3'-O-isopropylidenecytidine,
2',3'-O-isopropylidene-6-azacytidine,
2'-deoxycytidine,
2'-deoxy-5-fluorocytidine,
5-chloro-2'-deoxycytidine,
5-bromo-2'-deoxycytidine,
2'-deoxy-5-trifluoromethylcytidine,
arabinosyl uracil,
xyloxyl uracil,
arabinosyl cytosine,
xyloxyl cytosine,
arabinosyl thymine,
xylosyl thymine, and the like.

These primidine nucleoside derivatives are readily prepared by general synthetic methods of combining a pyrimidine moiety with a sugar group, such as a D-D-ribofuranose group, an arabinose group, a xylose group, or the like, e.g., methods such as those shown by Pontis et al., Biochem. Biophys, Acta, 51 138 (1961), Fox et al., J. Am. Chem. Soc., 83 4066 (1961) and Heidelberger et al., J. Am. Chem. Soc., 84, 3597 (1962), or in "Advances in Carbohydrate Chemistry," (New York: Academic Press, 1959), Vol. 14, pp. 283–380 and Vol. 17 (1962), pp. 301–369, or by carrying out known synthetic procedures upon preformed nucleosides.

While the starting nucleoside (II) cannot have free cis-hydroxyl groups in the 2'- and 3'-positions, it can have, besides trans-hydroxyl groups, a 2'-hydroxyl-3'-O-acyl- or a 3'-hydroxyl-2'-O-acyl-structure, or the corresponding structures wherein one hydroxyl group is protected by a labile ether grouping. Thus, after halogenation to replace the free hydroxyl group at either the 2'- or the 3'-position with halogen, the acyl group or labile ether group can be hydrolyzed and the halogenation reaction repeated to give a 2',3'-dideoxy-2',3-dihalonucleoside wherein the halogen atoms are the same or different. Similiarly, by protecting a hydroxyl group at the 5'-position by acylation or ether formation during an initial halogenation reaction or reactions, then hydrolyzing to remove the protective group and give a free 5'-hydroxyl group, and finally halogenating with an alkyltriaryloxyphosphonium halide or a halotriarylphosphonium halide, a di- or trihalonucleoside can be obtained which has the same or different halogens at the 2'-, 5'-, 3'-,5'- or 2',3'- and 5'-positions.

The thus-obtained halo-nucleosides of formula III hereinabove can be hydrogenated to replace halogen (whether initially present in the free hydroxyl-containing nucleoside, e.g., a 2'- or 5-fluoro substituent, or introduced by replacement of a hydroxyl group with chlorine, bromine, or iodine) with hydrogen. This will preferably be accomplished by first dissolving the halonucleoside, e.g., 5' - deoxy - 5' - iodo - 2',3' - O -isopropylideneuridine, in a lower alkanol, such as methanol, ethanol, or the like, containing from about 1 to about 10 molar equivalents, and preferably a molar excess of about 2 or more molar equivalents, of a strong base, e.g., ammonia, a trialkylamine, such as triethylamine, or the like, and then adding from about 5% to about 25% by weight, based on the weight of the halo-nucleoside starting material (III), of a hydrogenation catalyst, e.g., 2–5% palladium-on-charcoal, paladized barium sulfate, or the like, and finally passing hydrogen through the resulting suspension, preferably at room temperature and atmospheric pressure, until one molar equivalent of hydrogen has been absorbed for each halogen substituent, thus giving the corresponding unhalogenated nucleoside (IV), e.g., 5'-deoxy-2',3'-O-isopropylideneuridine (IV; $X^2$ and $R^3$=hydrogen, $Y^2+Z^2$=isopropylidenedioxy;

Besides the halogen substituents on the sugar moiety in the starting halo-nucleoside, halogen at the 4- or 5-positions or the halogens in a halo-lower alkyl group at the 5- position on the pyrimidine ring, and particularly chlorine, bromine and iodine, will also be replaced by hydrogen during the reaction. Thus, for example, 5'-deoxy-5, 5'-diiodo-2',3'-O-isopropylideneuridine will be converted to 5'-deoxy-2',3'-O-isopropylideneuridine during the hydrogenation reaction.

The novel deoxynucleosides and halodeoxynucleosides of Formula I hereinabove exhibit antimetabolic and antibacterial activity against a wide variety of organisms, including *Staphylococcus aureus, Proteus vulgaris, Klebsiella pneumoniae* and *Escherichia coli*.

In order that those skilled in the art can more fully understand the present invention, the following examples are set forth. These examples are given solely for the purpose of illustrating the invention, and should not be considered as expressing limitations unless so set forth in the appended claims.

*Example I*

To an anhydrous solution of 568 mg. (2 mmols) of 2',3'-O-isopropylideneuridine in 25 ml. of dimethylformamide there was added 1 gram (2.35 mmols) of methyltriphenoxyphosphonium iodide, and the resulting reaction mixture was allowed to stand at room temperature for 18 hours. Following this reaction period the solvent was evaporated under vacuum and the resulting residue was partitioned between chloroform and water. Next, the chloroform layer was washed twice with an aqueous 5% sodium thiosulfate solution, dried over anhydrous sodium sulfate and evaporated to dryness. Crystallization of the resulting residue from chloroform/hexane gave a 77% yield of 5'-deoxy-5'-iodo-2',3'-O-isopropylideneuridine, melting point 164–166° C.

This procedure was then repeated in every detail except for the following. First of all, 2',3'-O-isopropylideneuridine was replaced by 2'-deoxy-2'-fluorouridine, 2'-bromo-2'-deoxyuridine, 2'-deoxy-2'-iodouridine, 2'-deoxy - 5 - trifluoromethyluridine, thymidine, 5' - deoxythymidine, 3' - chloro - 3' - deoxythymidine, 5' - deoxy- 5' - fluorothymidine and 5' - deoxy - 5' - iodothymidine, respectively. Secondly, in the first, third, fifth, seventh and ninth of these analogous reactions, methyltriphenoxyphosphonium iodide was replaced by methyltriphenoxyphosphonium chloride, methyltriphenoxyphosphonium bromide, methyl tris(p-nitrophenoxy)phosphonium chloride, methyl tris(p-nitrophenoxy)phosphonium iodide and propyl tris(p-nitrophenoxy)phosphonium iodide, respectively. In each case, the corresponding halo-nucleoside, namely, 2',3',5'- trideoxy - 3',5' - dichloro - 2' - fluorouridine; 2',3',5' - trideoxy - 2' - bromo - 3',5' -diiodouridine; 2',3',5' - trideoxy - 3',5' - dibromo - 2' - iodouridine; 2',3',5' - trideoxy-3',5' - diiodo - 5 - trifluoromethyluridine; 3',5' - dideoxy - 3',5' - dichlorothymidine; 3', 5' - dideoxy - 3' - iodothymidine; 3',5' - dideoxy - 3'-chloro - 5' - iodothymidine; 3',5' - dideoxy - 3' - iodo - 5'-fluorothymidine and 3',5' - dideoxy - 3',5' - diiodothymidine, respectively, was obtained.

*Example II*

The 5' - deoxy - 5' - iodo - 2',3' - O - isopropylideneuridine obtained as described in Example I hereinabove was dissolved in 13 ml. of aqueous 80% acetic acid and heated at 100° C. for 90 minutes. Following this reaction period the reaction mixture was evaporated to dryness, and the resulting residue was crystallized from ethanol to give an 82% yield of 5'-deoxy-5'-iodouridine, melting point 184–186° C.

*Example III*

To an anhydrous solution of 171 mg. (0.6 mmol) of 5'-O-acetylthymidine in 15 ml. of dimethylformamide there was added 255 mg. (0.62 mmol) of methyltriphenoxyphosphonium iodide, and the resulting reaction mixture was allowed to stand at room temperature for 5 days. Following this reaction period the reaction mixture was chromatographed on neutral alumina, using methylene chloride/methanol (20:1, respectively, by volume) as the eluant, to give first the by-product diphenylmethylphosphonate and then, in 50% yield, 5'-O-acetyl-3'-deoxy-3'-iodothymidine, melting point 125–126° C.

*Analysis.*—Calc'd for $C_{12}H_{15}O_5N_2I$: C, 36.56; H, 3.84. Found: C, 36.81; H, 4.05.

This procedure was repeated in every detail with these exceptions: 5'-O-acetylthymidine was replaced by 5'-O-p-nitrobenzoylthymidine, and the reaction mixture was chromatographed on silicic acid with a linear gradient of ethyl acetate in chloroform (1:1 by volume). This modified procedure resulted in a 70% yield of 3'-deoxy-3'-iodo-5'-O-p-nitrobenzoylthymidine, melting point 154–156° C.

*Analysis.*—Calc'd for $C_{16}H_{16}O_7N_3I$: C, 40.73; H, 3.22; N, 8.38. Found: C, 40.88; H, 3.14; N, 8.21.

Example IV

Sixty mg. of the 5'-O-acetyl-3'-deoxy-3'-iodothymidine prepared as described in Example III hereinabove, was dissolved in 6 ml. of aqueous 0.2 N sodium hydroxide and heated at 37° C. for 30 minutes. Following this reaction period the reaction mixture was neutralized by passing it through a column of Dowex 50 (sulfonated polystyrene beads; 8% cross-linked by divinyl benzene; Dow Chemical Co.) ion-exchange resin in the H+ form, then filtered and evaporated to dryness. The resulting residue was then crystallized from 2 ml. of hot water to give a 71% yield of 3'-deoxy-3'-iodothymidine, melting point 165.5–166° C.

By repeating this procedure using 3'-deoxy-3'-iodo-5'-O-p-nitrobenzoylthymidine, also prepared as described in Example III hereinabove, the same product, i.e. 3'-deoxy-3'-iodothymidine, was obtained.

Example V

To an anhydrous solution of 228 mg. (1 mmol) of 2'-deoxyuridine in 5 ml. of dimethylformamide there was added 1 gram (2.35 mmols) of methyltriphenoxyphosphonium iodide, and the resulting reaction mixture was maintained at 37° C. for 96 hours. Following this reaction period the reaction mixture was evaporated to dryness and the resulting residue partitioned between water and chloroform. Next, the chloroform layer was washed with an aqueous 5% sodium thiosulfate solution and then chromatographed on silicic acid, with a linear gradient of acetone in chloroform (0–35% acetone, by volume), to give first the by-product diphenylmethylphosphonate and then 2',3',5'-trideoxy-3',5'-diiodouridine, melting point 143–144° C., which after crystallization from chloroform/hexane (8:2, respectively, by volume), was obtained in 84% yield.

*Analysis.*—Calc'd for $C_9H_{10}O_3N_2I$: C, 24.13; H, 2.25; N, 6.25. Found: C, 24.37; H, 2.43; N, 6.17.

Example VI

To an anhydrous solution of 143 mg. (0.5 mmol) of 2',3'-O-isopropylidene-6-azaruridine in 5 ml. of dimethylformamide there was added 0.4 gram (1 mmol) of methyltriphenoxyphosphonium iodide, and the resulting reaction mixture was maintained at 25° C. for 48 hours. Following this reaction period the reaction mixture was evaporated to dryness and the resulting residue partitioned between water and chloroform. Next, the chloroform layer was washed with an aqueous 5% sodium thiosulfate solution and then chromatographed on silicic acid, with a linear gradient of ethyl acetate in chloroform (0–20% ethyl acetate, by volume), to give first the by-product diphenylmethylphosphonate and then 5'-deoxy-5'-iodo-2',3'-isopropylidene-6-azauridine, melting point 178–180° C., which after crystallization from methylene chloride/heptane (1:1, respectively, by volume), was obtained in 50% yield.

*Analysis.*—Calc'd for $C_{11}H_{14}O_5N_3I$: C, 33.43; H, 3.52. Found: C, 33.60; H, 3.55.

By subjecting 5'-deoxy-5'-iodo-2',3'-O-isopropylidene-6-azauridine to acid hydrolysis in the manner described in Example II hereinabove, 5'-deoxy-5'-iodo-6-azauridine was obtained.

Example VII

To an anhydrous solution of 871 mg. (2 mmols) of 2',3'-O-benzylidenecytidine in 25 ml. of dimethylformamide there was added 1 gram (2.35 mmols) of methyltriphenoxyphosphonium iodide, and the procedure employed in Example I hereinabove was followed to give a 50% yield of 2',3'-O-benzylidene-5'-deoxy-5'-iodocytiline, melting point 210° C. with decomposition.

*Analysis.*—Calc'd for $C_{24}H_{24}O_4N_3I$: C, 43.55; H, 3.66. Found: C, 43.28; H, 3.70.

By subjecting this product to acid hydrolysis in the manner described in Example II hereinabove, 5'-deoxy-5'-iodocytidine was obtained.

Example VIII 127 mg. (1 mmol) of iodine and 289 mg. (1.1 mmols) of triphenylphosphine were added to 5 ml. of dimethylformamide and the resulting solution was maintained at room temperature with stirring, for 5 minutes. Next, 227 mg. (0.8 mmol) of 2',3'-O-isopropylideneuridine was added to the thus-prepared solution of iodotriphenylphosphonium iodide, and the resulting reaction mixture was allowed to stand at 35° C. for 72 hours. Following this reaction period the reaction mixture was evaporated to dryness and the resulting residue partitioned between water and chloroform. The chloroform layer was washed with an aqueous 5% sodium thiosulfate solution and then chromatographed on silicic acid, with a linear gradient of ethyl acetate in chloroform (0–20% ethyl acetate, by volume), to give a 59% yield of 5'-deoxy-5'-iodo-2',3'-O-isopropylideneuridine, melting point 164–166° C., identical to the product obtained in Example I hereinabove.

This procedure was then repeated in every detail except for the following. First of all, 2',3'-O-isopropylideneuridine was replaced by 2'-deoxy-5-fluorouridine, 5-chloro-2'-deoxyuridine, 3'-deoxythymidine, 5'-O-p-nitrophenylthymidine and 2'-deoxy-5-trifluoromethylcytidine, respectively, as the nucleoside starting materials. Secondly, the iodotriphenylphosphonium iodide was replaced by chlorotriphenylphosphonium chloride, bromotriphenylphoshonium bromide, chlorotri-p-nitrophenylphosphonium chloride, bromotri-nitrophenylphosphonium bromide and iodotri-p-nitrophenylphosphonium iodide, respectively. In each case, the corresponding halo-nucleoside, namely, 2',3',5'-trideoxy-3',5'-dichloro-5-fluorouridine; 2',3',5'-trideoxy-3',5'-dibromo-5-chlorouridine; 3',5'-dideoxy-5'-chlorothymidine; 3'-deoxy-3'-iodo-5'-p-nitrophenylthymidine and 2',3',5'-trideoxy-3',5'-diiodo-5-trifluoromethylcytidine, respectively, was obtained.

Example IX

To a solution of 211 mg. (1 mmol) of 3'-deoxy-3'-iodothymidine and 0.28 ml. (2 mmols) of triethylamine in 100 ml. of aqueous 50% methanol there was added 100 mg. of 5% palladium-on-charcoal hydrogenation catalyst, and the resulting suspension was shaken with hydrogen gas at atmospheric pressure and room temperature for 1 hour. Following this reaction period the suspension was filtered to remove the catalyst and the filtrate was then passed through a column containing Dowex 2 (cross-linked polystyrene; Dow Chemical Co.) ion-exchange resin in the bicarbonate form. After washing the column with water and evaporating the combined eluate and washings to dryness, the resulting residue was crystallized from acetone/petroleum ether (9:1, respectively, by volume) to give an 81% yield of 3'-deoxythymidine, melting point 145° C.

By repeating this procedure in every detail but one, namely, replacing 3'-deoxy-3'-iodothymidine with the halogenated nucleosides listed in Column A below, the corresponding unhalogenated nucleosides listed in Column B were obtained.

| A | B |
|---|---|
| 2',3',5'-trideoxy-3',5'-dichloro-2'-fluorouridine. | 2',3',5'-trideoxy-2'-fluorouridine. |
| 2',3',5'-trideoxy-2'-bromo-3',5'-diiodouridine. | 2',3',5'-trideoxyuridine. |
| 2',3',5'-trideoxy-3',5'-dibromo-2'-iodouridine. | Do. |
| 2',3',5'-trideoxy-3',5'-diiodo-5-trifluoromethyluridine. | 2',3',5'-trideoxy-5-methyluridine (3',5'-dideoxythymidine). |
| 2',3',5'-trideoxy-3',5'-diiodouridine. | 2',3',5'-trideoxyuridine. |
| 2',3',5'-trideoxy-3',5'-dichloro-5-fluorouridine. | Do. |
| 2',3',5'-trideoxy-3',5'-dibromo-5-chlorouridine. | Do. |
| 2',3',5'-trideoxy-3',5'-diiodo-5-trifluoromethylcytidine. | 2',3',5'-trideoxy-5-methylcytidine. |
| 3',5'-dideoxy-3',5'-dichlorothymidine. | 3',5'-dideoxythymidine. |
| 3',5'-dideoxy-3'-iodothymidine. | Do. |
| 3',5'-dideoxy-3'-chloro-5'-iodothymidine. | Do. |
| 3',5'-dideoxy-3',5'-diiodothymidine. | Do. |
| 3',5'-dideoxy-5'-chlorothymidine. | Do. |
| 5'-deoxy-5'-iodo-2',3'-O-isopropylideneuridine. | 5'-deoxy-2',3'-O-isopropylideneuridine. |
| 5'-deoxy-5'-iodouridine. | 5'-deoxyuridine. |
| 5'-deoxy-5'-iodo-2',3'-O-isopropylidene-6-azauridine. | 5'-deoxy-2',3'-O-isopropylidene-6-azauridine. |
| 5'-deoxy-5'-iodo-6-azauridine. | 5'-deoxy-6-azauridine. |
| 5'-O-acetyl-3'-deoxy-3'-iodothymidine. | 5'-O-acetyl-3'-deoxythymidine. |
| 3'-deoxy-3'-iodo-5'-O-p-nitrobenzoylthymidine. | 3'-deoxy-5'-O-p-nitrobenzoylthymidine. |
| 2',3'-O-benzylidene-5'-deoxy-5'-iodocytidine. | 5'-deoxycytidine. |
| '-deoxy-5'-iodocytidine. | Do. |

It will be obvious to those skilled in the art that other changes and variations can be made in carrying out the present invention without departing from the spirit and scope thereof as defined in the appended claims.

We claim:
1. A compound represented by the general formula:

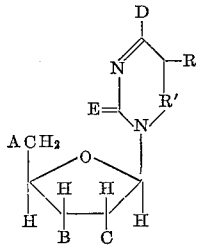

wherein A, B and C are each selected from the group consisting of hydrogen and halogen, with no more than two of A, B and C being fluorine, and when any of A, B and C are halogen, at least one of them being other than fluorine; R is selected from the group consisting of hydrogen, halogen, halo-lower alkyl, amino, amido, nitro, cyano and carboxy, with R being other than halogen and halo-lower alkyl when all of A, B, C and D are other than chloro, fluoro or iodo; R' is selected from the group consisting of

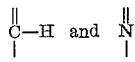

groupings; D is selected from the group consisting of hydroxyl, amino, halogen and halo-lower alkyl, with D being other than halogen and halo-lower alkyl when all of A, B and C are other than chloro, fluoro or iodo, and E is selected from the group consisting of keto, imino and thio.

2. 5'-O-acetyl-3'-deoxy-3'-iodothymidine.

3. 3'-deoxy-3'-iodo-5'-O-p-nitrobenzoylthymidine.
4. 2',3',5'-trideoxy-3',5'-diiodouridine.
5. 5'-deoxy-5'-iodo-2',3'-O-isopropylidene-6-azauridine.
6. 2',3'-O-benzylidene-5'-deoxy-5'-iodocytidine.
7. 3',5'-dideoxy-3',5'-dichlorothymidine.
8. 3',5'-dideoxy-3',5'-diiodothymidine.
9. 5'-deoxy-6-azauridine.
10. 2',3',5'-trideoxyuridine.
11. A process for the direct halogenation of the sugar moiety in a pyrimidine nucleoside which comprises reacting a pyrimidine nucleoside which has a free hydroxyl group in at least one of the 2'-, 3'- and 5'-positions, but which does not have adjacent free cis-hydroxyl groups in the 2'- and 3'-positions, in an inert organic solvent under substantially anhydrous conditions, with a member selected from the group consisting of an alkyltriaryloxyphosphonium halide and a halotriarylphosphonium halide wherein, in each case, the halogen is selected from the group consisting of chlorine, bromine, and iodine.
12. A process according to claim 11 wherein said pyrimidine nucleoside is a uridine derivative.
13. A process according to claim 11 wherein said pyrimidine nucleoside is a thymidine derivative.
14. A process according to claim 11 wherein said pyrimidine nucleoside is a cytidine derivative.
15. A process according to claim 11 where in the halogenating agent is an alkyltriaryloxyphosphonium halide.
16. A process according to claim 11 wherein the halogenating agent is a halotriarylphosphonium halide.
17. A process for the preparation of 5'-deoxy-5'-iodo-2',3'-O-isopropylideneuridine which comprises reacting 2',3'-O-isopropylideneuridine, in an inert organic solvent under substantially anhydrous conditions, with methyltriphenoxyphosphonium iodide.
18. A process for the preparation of 5'-deoxy-5'-iodo-2'-,3'-O-isopropylideneuridine which comprises reacting 2',3'-O-isopropylideneuridine, in an inert organic solvent under substantially anhydrous conditions, with iodotriphenylphosphonium iodide.
19. A process for the preparation of 5'-deoxy-5'-iodo-2',3'-O-isopropylidine-6-azauridine which comprises reacting 2',3'-O-isopropylidine-6-azauridine, in an inert organic solvent under substantially anhydrous conditions, with methyltriphenoxyphosphonium iodide.
20. A process for the preparation of 3',5'-dideoxy-3',5'-dichlorothymidine which comprises reacting thymidine, in an inert organic solvent under substantially anhydrous conditions, with methyl tris(p-nitrophenoxy)phosphonium chloride.
21. A process for the preparation of 5'-O-acetyl-3'-deoxy-3'-iodothymidine which comprises reacting 5'-O-acetylthymidine in an inert organic solvent under substantially anhydrous conditions, with methyltriphenoxyphosphonium iodide.
22. A process for the preparation of 2',3',5'-trideoxy-3',5'-diiodouridine which comprises reacting 2'-deoxyuridine in an inert organic solvent under substantially anhydrous conditions, with methyltriphenoxyphosphonium iodide.

References Cited by the Examiner

Michelson: "The chemistry of Nucleosides and Nucleotides," 1963, p. 71, Academic Press, New York, New York.

LEWIS GOTTS, *Primary Examiner.*

JOHNNIE R. BROWN, *Assistant Examiner.*

UNITED STATES PATENT OFFICE
CERTIFICATE OF CORRECTION

Patent No. 3,282,921 November 1, 1966

Julien P. H. Verheyden et al.

It is hereby certified that error appears in the above numbered patent requiring correction and that the said Letters Patent should read as corrected below.

Column 1, line 10, for "derivative" read -- derivatives --; lines 17 to 28, the formula should appear as shown below instead of as in the patent:

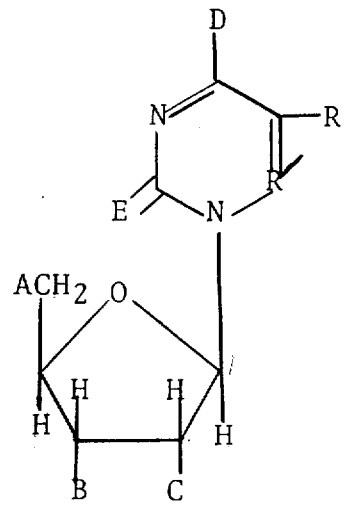

lines 59 to 69, the formula should appear as shown below instead of as in the patent:

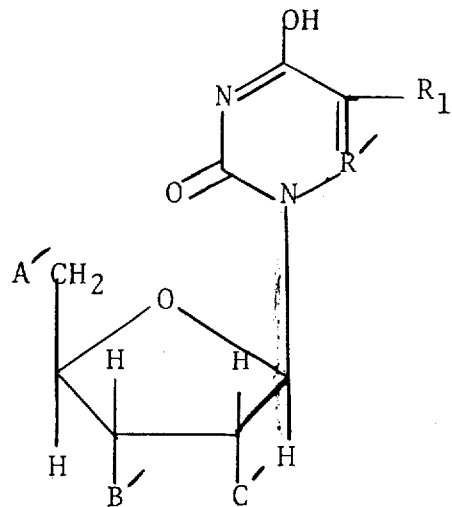

3,282,921 same column 1, line 72, for "Firmula" read -- Formula --; column 3, line 2, for "hydroxy" read -- hydroxyl--; line 52, for "amonoacetic" read -- aminoacetic --; line 61, for "R′=$\overset{H}{\underset{|}{C}}$-H" read -- R′ =$\overset{H}{\underset{|}{C}}$-H --; column 5, line 35, for "2′,3" read -- 2′,3′ --; column 8, line 13, for "iodocytiline" read -- iodocytidine --; column 8, line 48, for "bromotri-" read -- bromotri-p- --; column 9, line 29, for "′-deoxy-5′-iodocytidine" read -- 5′-deoxy-5′-iodocytidine --; same column 9, lines 37 to 47, the formula should appear as shown below instead of as in the patent:

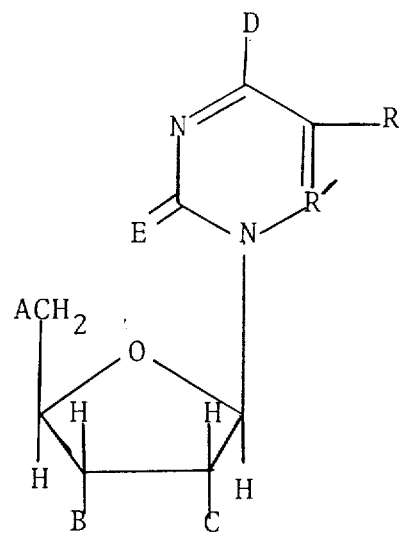

Signed and sealed this 29th day of August 1967.

(SEAL)
Attest:

ERNEST W. SWIDER
Attesting Officer

EDWARD J. BRENNER
Commissioner of Patents